May 24, 1949.  F. I. McCARTHY ET AL  2,471,070
SPARK PLUG
Filed March 26, 1945
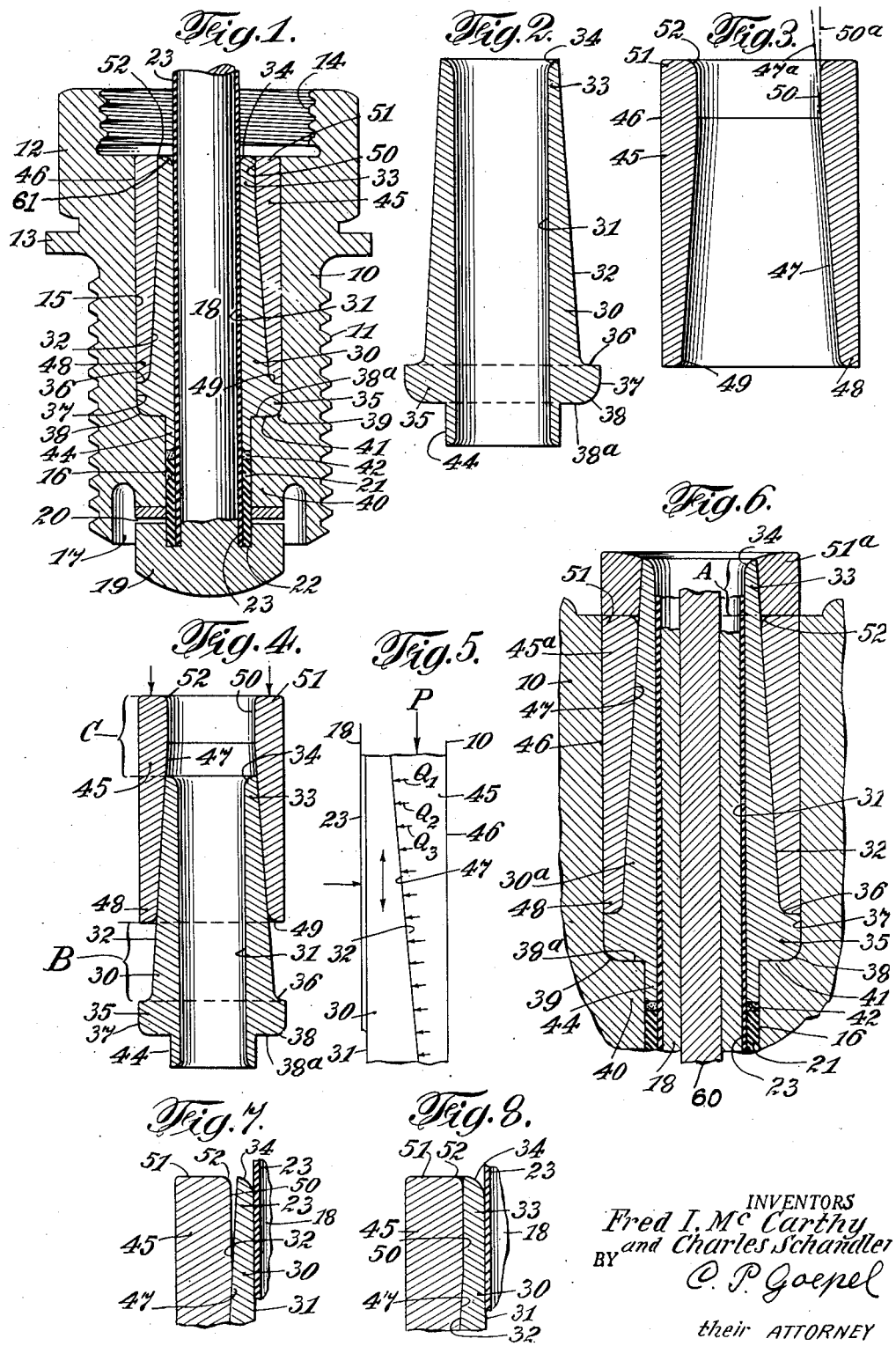
INVENTORS
Fred I. McCarthy
and Charles Schandler
BY
C. P. Goepel
their ATTORNEY Patented May 24, 1949

2,471,070

UNITED STATES PATENT OFFICE 2,471,070

SPARK PLUG

Frederick I. McCarthy and Charles Schandler,
New York, N. Y.

Application March 26, 1945, Serial No. 584,800

1 Claim. (Cl. 123—169)

This invention relates to spark plugs and has for its object to provide a spark plug in which there is no leakage, nor short circuiting, which has good heat dissipation, and in general a high rating and long life.

The invention consists in providing in the usual screw threaded shell having a central bore and an insulated stem with a spark tip spaced from the shell to form a spark gap, a non-moldable pressure means acting upon a moldable pressure receiving means exerting a uniformly distributed pressure inwardly towards the axis upon the insulating lining of the stem in a manner to safeguard the lining from the concentration of any pressure causing rupture of the lining, any such rupture providing a leakage condition or short circuiting along the stem which acts under one polarity, the shell acting under the opposite polarity. At the same time, the pressure means exert pressure outwardly in uniform distribution against the shell to secure good heat conductivity, without, however, causing an expansion of the shell, which expansion brings about a harmful change in the circumference of the external screw threads thereof.

The pressure receiving means in the form of a sleeve over the lined stem is the least dense and most ductile member, the shell is next in hardness and is normally rigid save for its inherent elasticity, and the pressure means in the form of a sleeve over the pressure receiving sleeve is the most dense or hardest of these three members, and is made intentionally rigid having only its own inherent elasticity, within the principle applicable to metals that the harder the metal, the less its elasticity and the most resistant to moldability. The outer sleeve is the hardest and most rigid and distributes the pressure forces applied thereto; the other two metals are of less hardness and rigidity which two metals respond to forces and reaction forces applied thereto.

More particularly the invention consists in a very dense and high tensile strength sleeve outwardly cylindrical and having an inner bore of slightly conical inclination to act in the nature of a wedge, and of a second sleeve of moldable material having its outer contour of conical shape and of substantially the same inclination to the axis as the conical inclination of the first sleeve, and having an inner bore of cylindrical shape concentric with the cylindrical stem and its surrounding cylindrical lining, and of a diameter substantially that of the stem. Variations in the crosssectional configuration of the stem would be followed by a corresponding change in the configuration of the bore of the inner sleeve. The second sleeve is forced into the bore of the first sleeve, with the second or inner sleeve surrounding the insulating lining of the central stem, by the outer sleeve being moved by a pressure applied thereto in one direction of the axis of the outer sleeve, whereupon the inner conical surface of the outer sleeve rides upon the outer conical surface of the inner sleeve, and presses the moldable material radially inward against the central stem. The relationship of the juxtaposed conical surfaces is such as to bring about a draft action which progressively molds the softer inner sleeve. This molding so compresses the insulating lining against the rigid stem by compressing the layers of the lining upon each other and closing intervening spaces and substantially solidifying the mica layers that a substantially solid insulating sleeve is formed impervious to any electrical leakage action. The rigidity of the outer sleeve is such as to resist during this molding of the inner sleeve, a radially outward movement against the shell, except only to the extent of its inherent elasticity. This slight radial expansion, however, causes a tight fit between the outer cylindrical surface of the pressure member or outer sleeve and the main cylindrical bore of the shell, thereby assuring good heat conductivity. The important improvement is the exertion of subtantially uniform pressure radially inward towards the central stem where it is most needed to obtain a tight leakage proof condition of the insulating lining along the stem, without modification of the outer threads of the shell.

With the application of this principle of the invention, embodiments of the invention have means to avoid an excess pressure at the base of the outer sleeve, by the provision of a cylindrical bore in the base portion of the outer sleeve, into which its conical bore merges, and in the flaring outwardly of the apex end of the inner sleeve, as a result of which a take up is provided guarding against the transmittal of excessive or acute puncturing pressure against the insulating lining near the point of application of the applied pressure. Also, the base of the inner sleeve is provided with a shoulder fitted conformingly into a shoulder portion of the shell at the lower end of its main bore, the shoulder of the shell resisting longitudinal movement of the moldable inner sleeve, and thus compelling the aforesaid draft action to take place. Finally, the inner sleeve has a cylindrical longitudinal extension beyond its shoulder which enters a space between the lined stem and a subcaliber bore of the shell, in order to protect the lining along that portion of the stem and to provide for a safety flow or displacement of this end of the inner member in the event that the moldable material exceeds the volumetric contents of the mold cavity formed by the rigid outer sleeve and stem, in which cavity the molding action of the inner sleeve takes place.

Other embodiments of the safety cylindrical bore of the outer sleeve may be provided, such as an extension of the inner sleeve at its apex, to reduce the pressure per unit area of the applied force near its point of application, all to the end that here as elsewhere no acute or concentrated force be transmitted to the insulating layer of the stem during the application of force to the outer sleeve.

The distribution of pressure without excessive pressure at any one point, also reacts on the heat transmittal characteristics providing a mass action heat transfer in contrast to any by-pass action due to greater concentration in density at any one or more points.

The invention will be further described hereinafter, embodiments shown in the drawings, and the invention will be finally claimed.

In the accompanying drawings,

Fig. 1 is a vertical central section of the improvements forming the invention, without, however, showing the known parts used in the completion of a commercial spark plug;

Fig. 2 is a vertical central section of the inner conical sleeve or pressure receiving member;

Fig. 3 is a vertical central section of the outer conical sleeve or pressure member;

Fig. 4 is a diagrammatic vertical central section of the outer conical sleeve placed on the inner conical sleeve, before the application of pressure to the outer sleeve;

Fig. 5 is a diagrammatic view of the forces distributed in the outer sleeve when pressure has been applied;

Fig. 6 is a vertical central section of the essential parts shown in Fig. 1, but showing a modification;

Fig. 7 is a diagram showing the base end of the outer sleeve and the apex end of the inner sleeve prior to the application of final applied pressure; and Fig. 8 shows the parts of Figure 7, after the final pressure has been applied.

Similar characters of reference indicate corresponding parts throughout the various views.

Referring to Fig. 1, the known parts are the shell 10 with exterior screw threads 11, having a hexagon 12, shoulder 13, interior screw threads 14, main bore 15, sub-caliber bore 16, and air space 17, and the central shaft or stem 18 with the sparking tip 19 spaced from the shell 10 by a sparking gap 20, an insulating ceramic sleeve 21 inserted and seated in recesses 22; and the insulating sleeve 23 of mica extending from the recesses 22 to the end of the central stem 18 by winding a plurality of layers of mica sheets along the length of the stem 18. Reference is made to our co-pending application Serial No. 559,880 filed October 23, 1944, for Spark plugs, now Patent No. 2,460,022, granted January 25, 1949, for the known parts just described.

The improvement consists in providing a copper member 30, which has a cylindrical bore 31 of substantially the same inner diameter as the outer diameter of the stem 18, allowing for the thickness of the mica insulation 23, and which has an outer peripheral conical portion 32 of an inclination of about 2° to the axis of the sleeve. The apex end 33 is bevelled off as at 34. The base portion 35 has a circumferential fillet 36, and extending shoulder 37 of a diameter substantially equal to that of the main bore 15 of the shell 10. The shoulder 37 has a circumferential rounded portion 38 of the general contour of a circumferentially extending rounded portion 39 at the end of the main bore 15. The end of the shoulder 37 has a flat portion 38a, substantially at right angles to the axis of the member 30, and the shell 10 has a shoulder 40 with a surface 41, substantially at right angles to the axis of the bore 15. This shoulder 40 of the shell 10 forms the sub-caliber bore 16, which bore 16 is somewhat larger in diameter than the outer diameter of the stem 18 and its lining forming a circumferential space 42 to allow for the ceramic sleeve 21, and for the extension member 44 forming a part of the inner conical member or sleeve 30. This sleeve 30 is shown in section in Fig. 2.

An outer conical sleeve 45 has an exterior cylindrical portion 46 and an interior conical portion 47; the inclination is about 2° to the axis of the sleeve. The interior inclination of member 45 is the same as the exterior inclination of the member 30. The apex end 48 of the member 45 has its inner end 49 rounded to conform to the fillet 36 of the member 30. At the base end 51 of the member 45, a cylindrical bore portion 50 is provided which merges into the inner bore or conical portion 47, and the base end of the cylindrical bore portion 50 is rounded as at 52. The dot dash line 47a shows the inclined extension of the surface 47 and the dot dash line 50a shows the cylindrical extension of the surface 50. (Fig. 3). The outer diameter of the sleeve 45 is substantially equal to the inner diameter of the main bore 15 of the shell 10. The longitudinal or axial length of the outer sleeve 45 is substantially equal to that of the inner sleeve 30 to the extent of the conical registration portion. The outer sleeve 45 is shown in section in Fig. 3. Comparing Fig. 3 with Fig. 2, it will be noted that the length of sleeve 45 equals the conical part of sleeve 30.

The form shown in Fig. 6 differs from that shown in Fig. 1 in that the inner conical sleeve 30a extends beyond the outer conical sleeve 45a, a small distance A as shown in Fig. 6, and in that the cylindrical inner bore of Fig. 3 is omitted. The action resulting from any such cylindrical contour is now obtained by the extension of the inner sleeve which is free from radial components of force. A copper washer 51a is fitted on with an electrical conducting cement and has a cylindrical or slightly conical bore.

From the foregoing, it will be noted that the outer sleeve 45 has an inner bore of an angularity the same as that of the outer conical part of the inner sleeve 30, and that the outer sleeve 45 has a cylindrical exterior of substantially the same circumference as that of the main bore 15 of the shell, and the inner sleeve 30 has a cylindrical inner bore of substantially the same circumference as that of the central stem, allowing for the insulating mica sleeve, when the parts are in operative or completed condition as shown in Figures 1 and 6.

The materials used in the making of the spark plug are: carbon steel for the shell 10, as generally employed for such shells, and for the central stem and sparking tip stainless steel as usually used for this purpose; ceramic for the sleeve 21, ceramic cement for the space 42, mica sheets for the sleeve 23; commercial copper of the usual ductility or tensile strength for the inner conical sleeve 30, and beryllium copper for the outer conical sleeve 45, said beryllium copper having a Rockwell 31C before hardening and 42C after hardening, the tensile strength being 125,000 after hardening.

This beryllium copper has been found by us to have the unexpected result of having that high rate of heat flow at certain zones of temperatures under which the plug functions which is necessary for the proper heat flow of the plug.

Having described the structures and materials, the functions are as follows:

In Fig. 4 the outer conical sleeve 45 rests upon the inner conical sleeve 30, and only pressure can force the outer sleeve in glove fit form over the inner sleeve. It will be noted that the base of the outer sleeve is spaced from the base of the inner sleeve the distance B equal to the distance C which the outer sleeve extends from the inner sleeve.

The distance B corresponds to a cut off portion of the outer conical sleeve, if it be assumed that the outer conical sleeve had extended to the base of the inner conical sleeve. This theoretical cut off provides what is known as a "draft." When pressure is applied to the outer conical sleeve, the interior conical surface of the outer sleeve rides upon the exterior conical surface of the inner sleeve, until the apex of the outer conical sleeve abuts against the shoulder of the inner sleeve 30. As the inner sleeve is made of copper and the outer sleeve of harder material, the inner sleeve gives and is molded into the interior of the outer sleeve and the inner sleeve is pressed against the mica layers, and these in turn pressed tightly against the spindle or stem providing a seal. As, however, the outer sleeve is not absolutely rigid or non-elastic, the outer sleeve is pressed at its exterior cylindrical surface against the wall of the main bore, and has its outer surface merged into the steel surface depressions, thus cementing the surfaces together. Reaction forces, however, are transmitted to the mica layer and in turn to the outer surface of the stem. The tensile strength or ductility of the outer conical sleeve is such that it distributes without deformation the forces applied at its base by pressure P, (7500 to 9000 pounds to the square inch), throughout its conical surface in relatively equal forces $Q_1$, $Q_2$, $Q_3$, etc. The forces, upon the inner conical sleeve, are also substantially the same. Should anyone of these forces $Q_1$, $Q_2$, etc. be considerably larger than an adjacent force, what may be termed a "splash" takes place. Such an acute force transmitted thru the inner copper sleeve against a certain point of the mica layer surrounding the stem, would puncture it. A splash may be termed, an acute force tending to rupture the mica layer.

To avoid such a splash at the base of the outer conical sleeve, where the external pressure is applied, the interior bore of the outer sleeve is made cylindrical and the terminal of the apex end of the inner sleeve is flared at its bore surface. The cylindrical portion of the bore also allows for the flow of the metal of the inner sleeve.

The relative tenacity of the three materials used is utilized. The tenacity of copper is less than that of steel, and the tenacity of beryllium copper is more than that of copper and more than that of steel (likewise, the modulus of elasticity, ductility and malleability). The dominant action is that of the outer conical sleeve 45 which has such a tenacity as to resist flow, and yet such elasticity to merge into the depressions of the steel shell, the steel shell being resistant to flow, and yet having some elasticity to react against the outer conical sleeve, and the inner conical sleeve having the least tenacity yet some elasticity inherent therein, to act against the outer conical sleeve and against the stem, through the intermediate mica layer. The ductility of the copper of the inner conical sleeve is availed of by mashing its shoulder portion against the shoulder of the steel shell. The space between the subcaliber bore of the shell and the mica covered stem is availed of by permitting entrance of the sleeve extension 44, and to allow for the flow of the same, upon the volume of the copper in the main bore exceeding the volume of the main bore itself. A filling 42 of a cement washer in the space is provided between the extremities of the copper sleeve 44 and the ceramic barrier 21.

In addition to the functional mechanical actions described the thermal actions provide a rapid transfer of heat from the sparking tip to the shell, to dissipate such heat by the use of the heat conductivity of the copper conical sleeves.

In the form shown in Fig. 6, the inner conical sleeve extends above the outer conical sleeve to provide a larger unit area for any so-called splash forces.

The important feature of the beryllium copper outer sleeve is that it distributes the applied force equally along its conical surface to the moldable copper inner sleeve, and due to its greater density, thereby acts to form an entire area seal, and still is of good heat conductivity at the temperature existing in the working conditions of the spark plug. The outer sleeve while transmitting forces outwardly, does not due to its density, effect the threads of the shell, as by enlarging the diameter of the same. By applying an equally distributed pressure upon the conical wedge surface of the outer sleeve, there is no acute force exerted through the moldable inner sleeve upon the mica layers resisted by the steel stem, such as to puncture the mica, and thus provide short circuiting.

The important underlying mode of operation is that the applied pressure is distributed towards the inner central stem, instead of to the outer shell.

Heat treatment of the outer conical sleeve increases its rigidity and tensile strength, and also increases its conductivity.

In Figure 7 is shown the relationship of the parts before the application of the final pressure, and in Figure 8, the same parts are shown after the final pressure has been applied. By final pressure is meant a final thrust home pressure, which is after the applied pressure upon the outer sleeve has moved it to its substantially final entrance position before which time the general molding action of the inner sleeve still takes place.

The angularity of the conical surface is only about 2° inclination to the coincident axes of the conical surfaces, and the base of the pressure member or outer sleeve is about $1/11$ of the generatrix of the bore of the outer sleeve. The generatrix of the outer cylindrical surface of the outer sleeve is substantially equal to the depth of the main bore, less the thickness of the shoulder of the inner sleeve. The apex end of the outer sleeve forms the entering end of the outer sleeve. The apex end of the inner sleeve is directed in the opposite direction to the apex end of the outer sleeve, the apex end of the outer sleeve being contiguous to the shoulder of the inner sleeve and thus adjacent the shoulder of the shell forming the bottom of the main bore. The progressively increasing depth of the inner sleeve is considerably less than the progressively increasing depth of the outer sleeve, when the parts are in completed united conditions.

In Figure 4 is shown the relationship of the two sleeves in respect to each other at the beginning of operations. The design is such that when the inner sleeve is seated on the shoulder of the shell, the outer sleeve in its initial position is seated on the inner sleeve in about the position shown in Fig. 4. In this initial position, the outer cylindrical surface of the outer sleeve is in contact with the cylindrical surface of the main bore, and the outer sleeve cannot be moved in deeper than shown, except only by an application of pressure at the base of the outer sleeve sufficient to overcome the tenacity of the inner sleeve and force its molding to shape into the mold cavity formed by the conical inner bore of the outer sleeve with the stem and its lining, which flowing action of the material of the inner sleeve continues until the outer sleeve has been forced to the end of its intended movement, namely, about when the apex end of the outer sleeve abuts against the shoulder of the inner sleeve. The compressed material during flow fills all the cavity gaps and about when the outer sleeve receives its final completion inward thrust, the inherent elasticity of the molded inner sleeve causes it to expand and this expansion, combined with force components radially inwards and outwards serves to compress the insulated lining, to press the soft inner sleeve material against the outer sleeve, and the outer sleeve against the cylindrical wall of the main bore, with all interstitial spaces or depressions of the respective materials filled by one or the other material, theoretically considered the softer material filling the depressions of the harder material. In consequence, when the spark plug has been completed, there is unity of parts indistinguishable save for color effects of the respective metals, when one of such spark plugs is cut into halves.

In Figure 4 the part of the outer sleeve which extends above the inner sleeve has an inner conical bore of cross-sectional circumferences smaller than any of the inner conical sleeve, and this reduction acts to confine the soft inner sleeve and mold it. As a continuation of the conical bore under such a reduction may cause too severe a compression of the soft inner member, the cylindrical portion of the bore is provided, and the juncture of the conical and cylindrical portions forms a controlling circumference as determining the depth of the apex end of the inner member, which even if thinner or flared is subjected to a flow action from the remaining mass of the inner member.

Thus, a cartridge for use in the making of spark plugs has been produced consisting of the inner sleeve and the outer sleeve having an end portion of smaller circumferences than those of the inner sleeve, protruding beyond the inner sleeve and having its apex portion spaced from the base of the inner sleeve the distance of said extension. The outer diameter of the outer sleeve is the diameter of the main bore of the shell, and the inner sleeve has a bore of a diameter equal to that of the stem and its lining.

The improved method consists in subjecting said lining longitudinally and circumferentially to a substantially uniformly distributed radially inward pressure, without exerting a thread displacement pressure upon the shell. And the method consists further in subjecting a conically shaped volume of moldable material disposed around a radial pressure resisting stem centrally thereof to a radially inward pressure by the sliding action of a conically shaped surface of a radial pressure resisting member upon said conical shaped surface of the moldable material, under confinement of the cross sectional circumference of the pressure resisting member being less than the cross sectional circumference of the moldable member, and consists further in subjecting the radial pressure resisting member to its own inherent elasticity expansion radially outwards by the reaction of the moldable member.

To increase the heat conductivity, the stem may be provided with a bore filled by compressed silver powder or by a rod of silver or by the combination of both, as shown by 60 in Figure 6.

As a preliminary step in the making of the spark plug, the inner sleeve is inserted to have its shoulder seat on the shoulder of the shell, and the shoulder of the inner sleeve is then subjected to the action of a plunger or die, which forces the sleeve shoulder tightly against the shell shoulder, molding it to shape. This molding causes a seal against pressure of gases. Thereafter, the outer sleeve is applied, and it provides by the actions described, a seal throughout the spark plug against the action of gases from the cylinder.

The combination of parts described produces a novel result in creating a radially inward even pressure on the mica which will make the electrical quality entirely correct without injuring the mica sleeve, and without producing a radially outward harmful pressure to bulge out the threads, and gives the plug a perfect leakage seal.

We have described several forms of our invention, but obviously various changes may be made in the details disclosed without departing from the spirit of the invention as set out in the following claim:

We claim:

In a spark plug, having an exteriorly screw threaded shell with a central main cylindrical bore, a central spark tip stem surrounded by an insulating lining spaced within said bore, an inner sleeve within the main bore having a cylindrical bore of substantially the same diameter as that of the lined stem, and of a length substantially equal to the depth of the main bore, and having an outer inclined surface converging to the entrance end of the bore, and providing a space of frusto-conical volumetric shape between it and the walls of the main bore, and an outer sleeve within the bore having a cylindrical outer surface of substantially the same diameter as that of the main bore, and having a conical bore of the same inclination as the inclination of the conical outer surface of the inner sleeve and diverging towards the bottom of the main bore, the material of the outer sleeve being harder than the material of the inner sleeve, and harder than the material of the shell, the combination of a shoulder for said inner sleeve having an outer diameter equal to the diameter of the main bore and having a bottom surface at right angles to the axis of the main bore with a curved lower corner and having a fillet at its upper portion merging into the inclined surface of the inner member, said outer sleeve having a curved entrance portion of a curvature corresponding to said fillet, and a shoulder on said shell having a part at right angles to the axis of the main bore merging into a fillet which forms a continuation of the cylindrical wall of the main bore, in registration with the bottom of the shoulder of the inner sleeve, which fillet has the same curvature as the curved lower corner of the shoulder of the inner sleeve, said shoulder of the shell forming a subcaliber bore in the shell for the spaced passage of the lined stem, the longitudinal length of the outer shell extending from said inner sleeve fillet to the upper end of the main bore, when said parts are assembled, said inner and outer sleeves prior to the assembly of the sleeves having the largest diameter of the entrance end of the inclined bore of the outer sleeve equal to a diameter of the inclined outer surface of the inner bore at about two thirds of the length of the inclined surface of the inner sleeve from its smallest diameter portion, with the entrance end of the outer sleeve spaced from the fillet of the shoulder of the inner sleeve a certain distance, and with the outer sleeve extending beyond the inner sleeve a distance equal to that spaced distance, each increment in diameter of said inner sleeve along said spaced distance being slightly larger than the internal diameter at the entrance end of the outer sleeve and each increment of the internal diameter of the extending part of the outer sleeve being smaller than the external diameter of the inner member where it is spaced from the extending end of the outer sleeve, whereby on pressure being applied to the extending end of the outer sleeve it is moved over the inner sleeve until it abuts the fillet of the shoulder of the inner sleeve, the inner sleeve being radially displaced increment by increment.

FREDERICK I. McCARTHY.
CHARLES SCHANDLER.

REFERENCES CITED

The following references are of record in the file of this patent:

UNITED STATES PATENTS

| Number | Name | Date |
|---|---|---|
| 1,588,489 | Mosler | June 15, 1926 |
| 1,793,803 | Hurley et al. | Feb. 24, 1931 |
| 1,927,500 | Paulson | Sept. 19, 1933 |
| 1,958,580 | Kasarjian | May 15, 1934 |
| 2,029,669 | Nowosielski | Feb. 4, 1936 |
| 2,060,219 | Kasarjian | Nov. 10, 1936 |
| 2,180,528 | Kasarjian | Nov. 21, 1939 |
| 2,187,472 | Kasarjian | Jan. 16, 1940 |